United States Patent [19]

Sasagawa

[11] Patent Number: 5,715,340
[45] Date of Patent: Feb. 3, 1998

[54] OPTICAL COUPLER CAPABLE OF PREVENTING OUTPUT OF UNWANTED LIGHT AT INCIDENCE END OF OPTICAL ISOLATOR

[75] Inventor: Miwa Sasagawa, Tokyo, Japan

[73] Assignee: NEC Corporation, Tokyo, Japan

[21] Appl. No.: 715,424

[22] Filed: Sep. 18, 1996

[30] Foreign Application Priority Data

Sep. 19, 1995 [JP] Japan ................... 7-239557

[51] Int. Cl.$^6$ ............................... G02B 6/32
[52] U.S. Cl. ............. 385/33; 385/31; 385/42; 385/38
[58] Field of Search ............. 385/33, 31, 32, 385/34, 35, 38, 39, 73, 74, 42, 43, 11, 15, 24

[56] References Cited

U.S. PATENT DOCUMENTS 5,195,155  3/1993  Shimaoka et al. ............ 385/33 X
5,574,809  11/1996  Watanabe et al. ............ 385/31

*Primary Examiner*—Phan T.- H. Palmer
*Attorney, Agent, or Firm*—Sughrue, Mion, Zinn, Macpeak & Seas, PLLC

[57] ABSTRACT

In an optical coupler comprising a first optical fiber (1) and a second optical fiber (2), first and second outgoing fiber ends of the first and second optical fibers are optically coupled along a predetermined length. First and second incidence fiber ends of the first and second incidence fibers are supplied with first and second lights, respectively. A primary condensing lens (10) is supplied with first and output lights from the first and second optical fibers and condenses the first and second output lights to produce a first condensing light. An optical isolator (8) has an incidence isolator end and an outgoing isolator end. The optical isolator is supplied with the first condensing light from the primary condensing lens through the incidence isolator end to output the first condensing light from the outgoing isolator end. The optical isolator prevents output of an unwanted light at the incidence isolator end. A secondary condensing lens (11) is supplied with the first condensing light from the optical isolator and condenses the first condensing light to produce a second condensing light. A third optical fiber (3) supplied with the second condensing light from the secondary condensing lens. The secondary condensing lens may be omitted.

8 Claims, 1 Drawing Sheet

OPTICAL COUPLER CAPABLE OF PREVENTING OUTPUT OF UNWANTED LIGHT AT INCIDENCE END OF OPTICAL ISOLATOR

FIELD OF THE INVENTION

The invention relates to an optical coupler, and more particularly, to a small coupler having an optical isolator for preventing output of an unwanted light at an incidence end of the optical isolator.

BACKGROUND OF THE INVENTION

In the manner which will later be described, a first conventional optical coupler comprises a first optical fiber, a second optical fiber, a third optical fiber, a first condensing lens, a second condensing lens, a third condensing lens, a dielectric mirror, and an optical isolator.

The first optical fiber is supplied with a first light to propagate the first light. The first optical fiber outputs the first light. The first condensing lens is positioned to receive the first light from the first optical fiber. The first condensing lens is supplied with the first light and condenses the first light to produce a first condensing light. The dielectric mirror is positioned with a predetermined interval relative to the first condensing lens. The dielectric mirror is postured to have a predetermined angle with the first optical axis of the first condensing lens.

The second optical fiber is supplied with a second light to propagate the second light. The second optical fiber outputs the second light. The second condensing lens is positioned to receive the second light from the second optical fiber. The second condensing lens is supplied with the second light and condenses the second light to produce a second condensing light. The dielectric mirror is positioned with a predetermined interval relative to the second condensing lens. The dielectric mirror is postured to have a predetermined angle with the second optical axis of the second condensing lens, so that a direction of reflection of the second condensing light from the dielectric mirror coincides with the propagation direction of the first condensing light. The dielectric mirror is supplied with the first and second condensing lights from the first and second condensing lenses. The dielectric mirror couples the first and second condensing lights to produce a coupled light.

The third condensing lens is positioned with a predetermined interval relative to the dielectric mirror. The third condensing lens is supplied with the coupled light from the dielectric mirror. The third condensing lens condenses the coupled light and produces a third condensing light. In a direction of propagation of the third condensing light, the optical isolator is positioned adjacently to the third condensing lens. The third optical fiber is connected to an outgoing isolator end of the optical isolator. The optical isolator is supplied with the third condensing light from the third condensing lens through an incidence isolator end of the optical isolator to output the third condensing light from the outgoing isolator end. The optical isolator prevents output of an unwanted light at the incidence isolator end of the optical isolator.

A second conventional optical coupler comprises first and second optical fibers which have center portions that are fused to each other at a predetermined length. The second conventional optical coupler is disclosed in Japanese Unexamined Patent Prepublication (Kokai) No. 250429/1992 and No. 26 3003/1991. Namely, the second conventional optical coupler has branching portions out of the center portions and four input-output ports.

However, since the first conventional coupler is supplied with the first and second lights which are inputted in different directions, the first conventional coupler must have three input-output ports in different directions. As a result, it is hardly possible to provide a small optical coupler module.

Since the second conventional coupler has the branching portions out of the center portions, it is also hardly possible to provide a small optical coupler module.

SUMMARY OF THE INVENTION

Accordingly, it is an object of the invention to provide an optical coupler which is capable of decreasing a size of the optical coupler.

Other objects of the invention will become clear as the description proceeds.

According to an aspect of the invention, there is provided an optical coupler which comprises:

a first optical fiber having a first incidence fiber end and a first outgoing fiber end, the first incidence fiber end being supplied with a first light;

a second optical fiber having a second incidence fiber end and a second outgoing fiber end, the second incidence fiber end being supplied with a second light, the second outgoing fiber end being optically coupled to the first outgoing end along a predetermined length;

a first condensing lens supplied with a first output light and a second output light from the first outgoing fiber end of the first optical fiber and the second outgoing fiber end of the second optical fiber for condensing the first and second output lights to produce a first condensing light;

an optical isolator having an incidence isolator end and an outgoing isolator end, the optical isolator supplied with the first condensing light from the first condensing lens through the incidence isolator end to output the first condensing light from the outgoing isolator end, the optical isolator being for preventing output of an unwanted light at the incidence isolator end;

a second condensing lens supplied with the first condensing light from the optical isolator for condensing the first condensing light to produce a second condensing light; and a third optical fiber supplied with the second condensing light from the second condensing lens.

According to another aspect of the invention, there is provided an optical coupler which comprises:

a first optical fiber having a first incidence fiber end and a first outgoing fiber end, the first incidence fiber end being supplied with a first light;

a second optical fiber having a second incidence fiber end and a second outgoing fiber end, the second incidence fiber end being supplied with a second light, the second outgoing fiber end being optically coupled to the first outgoing fiber end along a predetermined length;

a condensing lens supplied with a first output light and a second output light from the first outgoing fiber end of the first optical fiber and the second outgoing fiber end of the second optical fiber for condensing the first and second output lights to produce a condensing light;

an optical isolator having an incidence isolator end and an outgoing isolator end, the optical isolator supplied with the condensing light from the condensing lens through the incidence isolator end to output the condensing light from the outgoing isolator end, the optical isolator being for preventing output of an unwanted light at the incidence isolator end; and a third optical fiber having a third incidence fiber end and a third outgoing fiber end for receiving the condensing light from the optical isolator, the third incidence fiber end being optically coupled to the outgoing isolator end.

BRIEF DESCRIPTION OF THE DRAWINGS

The invention will be explained in more detail in conjunction with appended drawings, wherein.

DESCRIPTION OF THE PREFERRED EMBODIMENT

Figure 1:
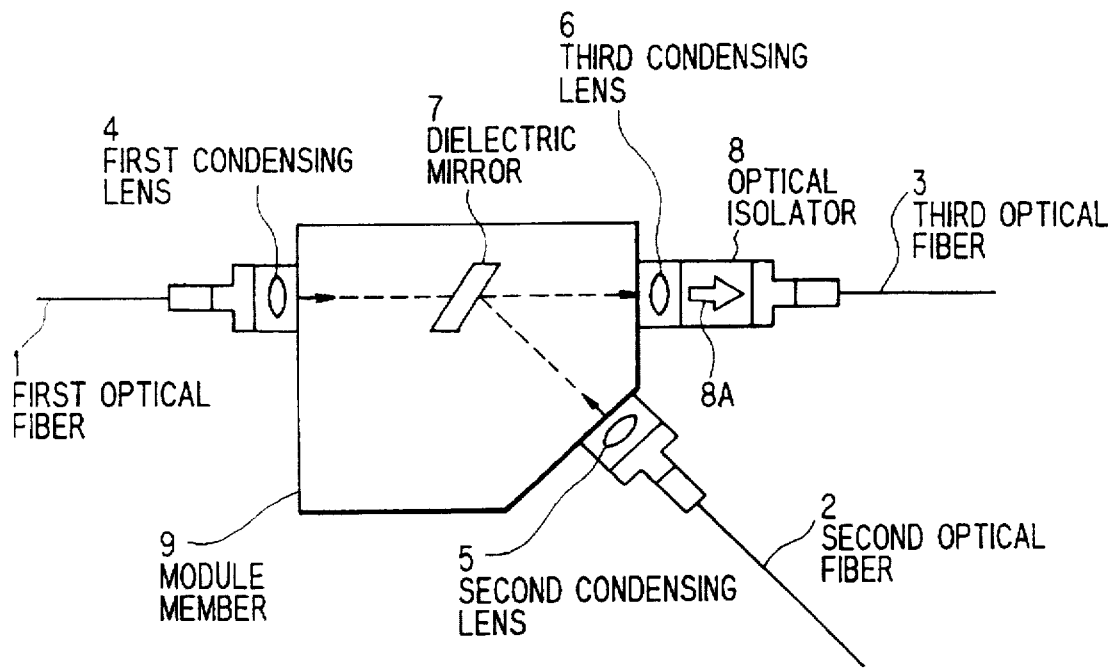
FIG. 1 is a schematic elevational view of a conventional optical coupler.

Before explaining an optical coupler in the preferred embodiment according to the invention, the abovementioned conventional optical coupler will be explained in FIG. 1.

The conventional optical coupler comprises a first optical fiber 1, a second optical fiber 2, a third optical fiber 3, a first condensing lens 4, a second condensing lens 5, a third condensing lens 6, a dielectric mirror 7, and an optical isolator 8, respectively, which are attached on a module member 9.

The first optical fiber 1 is supplied with a first light to propagate the first light. The first optical fiber 1 outputs the first light from a first outgoing end of the first optical fiber 1. The first condensing lens 4 is positioned to receive the first light from the first optical fiber 1. The first condensing lens 4 is supplied with the first light and condenses the first light to produce a first condensing light. On a first optical axis of the first condensing lens 4, the dielectric mirror 7 is positioned with a predetermined space relative to the first condensing lens 4 in a direction of propagation of the first condensing light. The dielectric mirror 7 has a predetermined angle with the first optical axis of the first condensing lens 4.

The second optical fiber 2 is supplied with a second light to propagate the second light. The second optical fiber 2 outputs the second light from a second outgoing end of the second optical fiber 2. The second condensing lens 5 is positioned to receive the second light from the second optical fiber 2. The second condensing lens 5 is supplied with the second light and condenses the second light to produce a second condensing light. On a second optical axis of the second condensing lens 5, the dielectric mirror 7 is positioned with a predetermined space relative to the second condensing lens 5 in a direction of propagation of the second condensing light. The dielectric mirror 7 has a predetermined angle with the second optical axis of the second condensing lens 5, so that a direction of reflection of the second condensing light from the dielectric mirror 7 coincides with the direction of propagation of the first condensing light. The dielectric mirror 7 is supplied with the first and second condensing lights from the first and second condensing lenses 4 and 5. The dielectric mirror 7 couples the first and second condensing lights to produce a coupled light.

On the first optical axis of the first condensing lens 4, the third condensing lens 6 is positioned with a predetermined space relative to the dielectric mirror 7 in a direction of propagation of the coupled light. The third condensing lens 6 is supplied with the coupled light from the dielectric mirror 7. The third condensing lens 6 condenses the coupled light and produces a third condensing light. In a direction of propagation of the third condensing light, the optical isolator 8 is positioned adjacently to the third condensing lens 6. The third optical fiber 3 is connected to an outgoing isolator end of the optical isolator 8. The optical isolator 8 is supplied with the third condensing light from the third condensing lens 6 through an incidence isolator end of the optical isolator 8 to output the third condensing light (shown by an arrow 8A) from the outgoing isolator end of the optical isolator 8. The optical isolator 8 prevents output of an unwanted light at the incidence isolator end of the optical isolator 8.

For example, a fourth fiber end of the third optical fiber 3 is connected to a fourth optical fiber (not shown), a core of which is doped with erbium. When the first light is used as an exciting light and the second light is used as a signal light to be amplified, these lights are coupled as the coupled light to be outputted through the third condensing lens 6. The third condensing light is amplified by the fourth optical fiber which is an optical fiber amplifier.

However, since the conventional coupler is supplied with the first and second lights which are inputted in different directions, the conventional coupler must have three input-output ports in different directions. As a result, it is hardly possible to provide a small optical coupler module.

Figure 2:
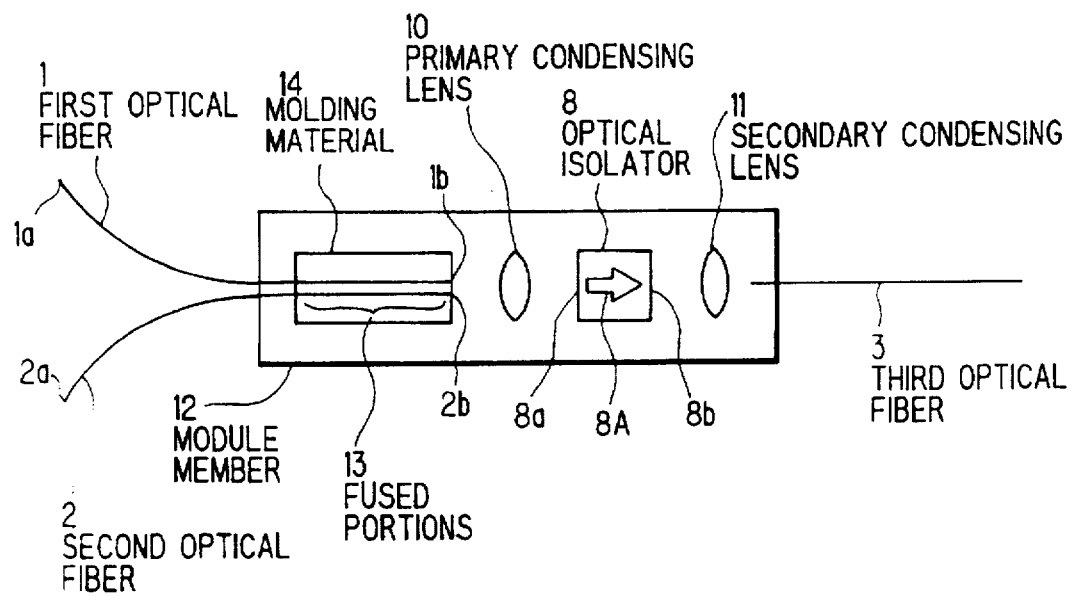
FIG. 2 is a schematic elevational view of an optical coupler according to an embodiment of the invention.

Referring to FIG. 2, the description will proceed to an optical coupler according to an embodiment of the invention. Similar parts are designated by like reference numerals.

The optical coupler comprises a first optical fiber 1, a second optical fiber 2, a third optical fiber 3, a primary condensing lens 10, a secondary condensing lens 11, and an optical isolator 8, respectively, which are attached to a module member 12.

The first optical fiber 1 has the first incidence fiber end 1a and the first outgoing fiber end 1b. The first incidence fiber end 1a is supplied with the first light. The second optical fiber 2 has the second incidence fiber end 2a and the second outgoing fiber end 2b. The second incidence fiber end 2a is supplied with the second light. The second optical fiber 2 is optically coupled to the first optical fiber 1 along a predetermined length on the sides of the fiber ends 1b and 2b. More particularly, the first and second optical fibers 1 and 2 have fused portions 13 in which the first and second optical fibers 1 and 2 are fused along the predetermined length. The fused portions 13 are made by heating and pressing the first and second optical fibers 1 and 2. The fused portions 13 are covered by a molding material 14. Thus, the fused portions 13 have an outgoing end which is the same as an outgoing end of a single fiber. For example, the first and second optical fibers 1 and 2 having the fused portions 13 may be obtained by fusing two optical fibers in the center portions, and by cutting the fused fibers at a predetermined point of the center portions. Also, the first and second optical fibers 1 and 2 having the fused portions 13 may be obtained by fusing two optical fibers at end portions and cut at a predetermined point of the end portions.

The primary condensing lens 10 is supplied with a first output light and a second output light from the first outgoing fiber end 1b of the first optical fiber 1 and the second outgoing fiber end 2b of the second optical fiber 2. The primary condensing lens 10 condenses the first and second output lights to produce a first condensing light.

The optical isolator 8 has the incidence isolator end 8a and the outgoing isolator end 8b. The optical isolator 8 is supplied with the first condensing light from the primary condensing lens 10 through the incidence isolator end 8a to output the first condensing light (shown by the arrow 8A) from the outgoing isolator end 8b. The optical isolator 8 prevents output of an unwanted light at the incidence isolator end 8a. The optical isolator 8 may be preferably implemented by a non-polarization dependent optical isolator which is supplied with the first condensing light from the primary condensing lens 10 through the incidence isolator end 8a not to be dependent on of a plane of polarization of the first condensing light.

The secondary condensing lens 11 is supplied with the first condensing light from the optical isolator 8. The secondary condensing lens 11 condenses the first condensing light to produce a second condensing light. The third optical fiber 3 is supplied with the second condensing light from the secondary condensing lens 11.

For example, a third fiber end of the third optical fiber 3 is connected to the fourth optical fiber (not shown), a core of which is doped with erbium. When the first light is used as an exciting light and the second light is used as a signal light to be amplified, these lights are coupled as the coupled light. The first light has a wavelength of 1.42 µm. The second light has a wavelength of 1.55 µm. The first light becomes an evanescent wave at the fused portions 13 that shifts from the first optical fiber 1 to the second optical fiber 2. As a result, both of the excitation and signal lights having the wavelengths of 1.42 µm and 1.55 µm are outputted from the outgoing end of the fused portions 13.

The excitation and signal lights radiated from the fused end portions 1b and 2b are collimated by the primary condensing lens 10, and the collimated lights are supplied via the non-polarization dependent optical isolator 18 to the secondary condensing lens 11, so that the collimated lights are focused on an incidence end plane of the third optical fiber 3 which is connected the Er-doped optical fiber, in which the signal light is amplified in accordance with inductive emission phenomenon. Even if the signal light propagated through the third optical fiber 3 is reflected at a reflection end plane of an optical part such as an optical connector, the reflected light is not transmitted to the side of the primary condensing lens 10, because the non-polarization dependent optical isolator 8 is used to stop any polarization light.

While the invention has thus far been described in conjunction with a single embodiment thereof, it will readily be possible for those skilled in the art to put the invention into practice in various manners. For example, the secondary condensing lens 11 may be omitted. In this event, the optical isolator 8 is directly fused to be aligned with the third optical fiber 3.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. An optical coupler comprising:
  a first optical fiber having a first incidence fiber end and a first outgoing fiber end, said first incidence fiber end being supplied with a first light;
  a second optical fiber having a second incidence fiber end and a second outgoing fiber end, said second incidence fiber end being supplied with a second light, said second outgoing fiber end being optically coupled to said first outgoing end along a predetermined length;
  a first condensing lens supplied with a first output light and a second output light from said first outgoing fiber end of said first optical fiber and said second outgoing fiber end of said second optical fiber for condensing said first and second output lights to produce a first condensing light;
  an optical isolator having an incidence isolator end and an outgoing isolator end, said optical isolator supplied with said first condensing light from said first condensing lens through said incidence isolator end to output said first condensing light from said outgoing isolator end, said optical isolator being for preventing output of an unwanted light at said incidence isolator end;
  a second condensing lens supplied with said first condensing light from said optical isolator for condensing said first condensing light to produce a second condensing light; and
  a third optical fiber supplied with said second condensing light from said second condensing lens.

2. An optical coupler as defined in claim 1, wherein said first outgoing fiber end of said first optical fiber is fused to said second outgoing fiber end of said second optical fiber along a predetermined length.

3. An optical coupler as defined in claim 2, wherein said optical isolator is a non-polarization dependent optical isolator.

4. An optical coupler as defined in claim 1, wherein said optical sensor is a non-polarization dependent optical isolator.

5. An optical coupler comprising:
  a first optical fiber having a first incidence fiber end and a first outgoing fiber end, said first incidence fiber end being supplied with a first light;
  a second optical fiber having a second incidence fiber end and a second outgoing fiber end, said second incidence fiber end being supplied with a second light, said second outgoing fiber end being optically coupled to said first outgoing fiber end along a predetermined length;
  a condensing lens supplied with a first output light and a second output light from said first outgoing fiber end of said first optical fiber and said second outgoing fiber end of said second optical fiber for condensing said first and second output lights to produce a condensing light;
  an optical isolator having an incidence isolator end and an outgoing isolator end, said optical isolator supplied with said condensing light from said condensing lens through said incidence isolator end to output said condensing light from said outgoing isolator end, said optical isolator being for preventing output of an unwanted light at said incidence isolator end; and
  a third optical fiber having a third incidence fiber end and a third outgoing fiber end for receiving said condensing light from said optical isolator, said third incidence fiber end being optically coupled to said outgoing isolator end.

6. An optical coupler as defined in claim 3, wherein said first outgoing fiber end of said first optical fiber is fused to said second outgoing fiber end of said second optical fiber along a predetermined length.

7. An optical coupler as defined in claim 6, wherein said optical isolator is a non-polarization dependent optical isolator.

8. An optical coupler as defined in claim 5, wherein said optical isolator is a non-polarization dependent optical isolator.

* * * * *

UNITED STATES PATENT AND TRADEMARK OFFICE
CERTIFICATE OF CORRECTION

PATENT NO.   : 5,715,340
DATED        : February 3, 1998
INVENTOR(S)  : Miwa SASAGAWA It is certified that error(s) appears in the above-identified patent and that said Letters Patent is hereby corrected as shown below:

Col. 6, line 26, change "sensor" to --isolator--.

Signed and Sealed this

Twenty-fourth Day of November,1998

Attest:

BRUCE LEHMAN

Attesting Officer

Commissioner of Patents and Trademarks